US012722415B2

(12) United States Patent
Goto et al.

(10) Patent No.: US 12,722,415 B2
(45) Date of Patent: Sep. 1, 2026

(54) HOLDER HOUSING TOOL AND FILE

(71) Applicant: KING JIM CO., LTD., Tokyo (JP)

(72) Inventors: Natsuki Goto, Tokyo (JP); Koichi Tanimoto, Tokyo (JP)

(73) Assignee: KING JIM CO., LTD., Tokyo (JP)

( * ) Notice: Subject to any disclaimer, the term of this patent is extended or adjusted under 35 U.S.C. 154(b) by 102 days.

(21) Appl. No.: 18/273,696

(22) PCT Filed: Mar. 23, 2022

(86) PCT No.: PCT/JP2022/013543

§ 371 (c)(1),
(2) Date: Jul. 21, 2023

(87) PCT Pub. No.: WO2023/286376

PCT Pub. Date: Jan. 19, 2023

(65) Prior Publication Data

US 2024/0075765 A1 Mar. 7, 2024

(30) Foreign Application Priority Data

Jul. 15, 2021 (JP) ................................ 2021-117292

(51) Int. Cl.
*B42F 7/04* (2006.01)

(52) U.S. Cl.
CPC .................................... *B42F 7/04* (2013.01)

(58) Field of Classification Search
CPC ................ B42F 7/04; B42F 7/06; B42F 9/00
See application file for complete search history.

(56) References Cited

U.S. PATENT DOCUMENTS 4,444,418 A * 4/1984 Goldstein ................ B42F 7/06 402/75
5,236,226 A * 8/1993 Sheffield .................. B42F 7/02 281/31
6,453,589 B1 * 9/2002 Schwartz ................. B42F 7/02 281/31
2008/0257940 A1 * 10/2008 Busam ................... B42F 21/02 281/31

(Continued)

FOREIGN PATENT DOCUMENTS

JP S58-192076 U 12/1983
JP S60-051079 U 4/1985

(Continued)

OTHER PUBLICATIONS

International Search Report issued in International Application No. PCT/JP2022/013543 dated Mar. 23, 2022.

(Continued)

*Primary Examiner* — Derek J Battisti
(74) *Attorney, Agent, or Firm* — TROUTMAN PEPPER LOCKE LLP

(57) ABSTRACT

To provide a holder housing tool with high general-purpose properties and favorable usability, and a file including the holder housing tool. A holder housing tool includes a first restriction part and a second restriction part. The first restriction part is hooked on one edge portion of an opening part of a holder by being inserted into the opening part. The second restriction part restricts the position of the holder at a position where the first restriction part is hooked by coming into contact with the holder.

12 Claims, 7 Drawing Sheets

(56) References Cited

U.S. PATENT DOCUMENTS

| | | | | |
|---|---|---|---|---|
| 2012/0175407 A1* | 7/2012 | Busam | B42F 21/02 | |
| | | | 229/67.1 | |
| 2014/0291977 A1* | 10/2014 | Harris | B42F 7/06 | |
| | | | 281/45 | |
| 2015/0021899 A1* | 1/2015 | Coore-Widener | A45C 3/02 | |
| | | | 281/29 | |
| 2015/0117934 A1* | 4/2015 | Cheng | B42F 13/26 | |
| | | | 402/38 | |
| 2018/0015773 A1* | 1/2018 | Lee | B42F 7/065 | |

FOREIGN PATENT DOCUMENTS

| | | | |
|---|---|---|---|
| JP | 3073495 | U | 11/2000 |
| JP | 2003285583 | A | 10/2003 |
| JP | 3148453 | U | 1/2009 |
| JP | 2011183591 | A | 9/2011 |
| JP | 2015229310 | A | 12/2015 |
| JP | 2016148785 | A | 8/2016 |
| WO | 20070132522 | A1 | 11/2007 |

OTHER PUBLICATIONS

Office Action issued in Japanese Patent Application No. 2025-027597 dated Dec. 3, 2025 (with machine translation).

* cited by examiner

HOLDER HOUSING TOOL AND FILE

CROSS-REFERENCE TO RELATED APPLICATIONS

This Application is a National Stage of International Application PCT/JP2022/013543 filed Mar. 23, 2022, which claims priority to Japanese Application No. 2021-117292 filed Jul. 15, 2021. The above applications are incorporated herein by reference in their entirety.

TECHNICAL FIELD

The present invention relates to a holder storage tool that houses a holder to store an item to be stored in a manner allowing the item to be stored to be put into the holder and the stored item to be taken out of the holder through an opening part and a file including the holder housing tool.

BACKGROUND

A clear folder is conventionally known as a holder to store and holds an item to be stored such as a paper sheet. The clear folder alone finds difficulty in holding items to be stored in large quantity for its configuration. Furthermore, holding a plurality of documents or the like in one clear folder makes it hard to find and manage the documents. Hence, such documents or the like are generally stored separately in a plurality of clear folders. This brings about a need to manage these clear folders collectively.

In this regard, there is a known file that holds a plurality of clear folders while hooking the top and bottom of each of the clear folders on a hook (see Japanese Registered Utility Model Publication No. 3148453, for example). There is also a known file with a plurality of clear folders fixedly attached together in a book form to a cover (see Japanese Laid-open Patent Publication No. 2015-229310, for example).

In the case of the file shown in Japanese Registered Utility Model Publication No. 3148453, however, it is required to use a dedicated clear folder with a notch allowing insertion of a hook, resulting in poor general purpose-properties.

In the case of the file shown in Japanese Laid-open Patent Publication No. 2015-229310, each of the clear folders cannot be handled while being detached from the cover.

The present invention has been made in view of the above-described issues, and is intended to provide a holder housing tool with high general-purpose properties and favorable usability, and a file including the holder housing tool.

SUMMARY

A holder housing tool according is a holder housing tool that houses a holder to store an item to be stored in a manner allowing the item to be stored to be put into the holder and the stored item to be taken out of the holder through an opening part of the holder, including: a first restriction part hooked on one edge portion of the opening part of the holder by being inserted into the opening part; and a second restriction part that restricts the position of the holder at a position where the first restriction part is hooked by coming into contact with the holder.

A holder housing tool is such that, in the holder housing tool, the second restriction part contacts the holder at a position separated from the opening part.

A holder housing tool is such that the holder housing tool includes a pocket part in which the holder is inserted and held on the side of one edge portion of the holder.

A holder housing tool is such that, in the holder housing tool, the pocket part includes one pocket piece and the other pocket piece located on opposite sides to each other with respect to the holder, and the one pocket piece and the other pocket piece have respective end portions adjacent to an opening of the pocket part that are shifted in a direction in which the holder is inserted into the pocket part.

A holder housing tool is such that, in the holder housing tool, the first restriction part is formed integrally with one of the one pocket piece and the other pocket piece.

A holder housing tool is such that, in the holder housing tool, the first restriction part is formed by folding a part of one of the one pocket piece and the other pocket piece toward the other.

A holder housing tool is such that, in the holder housing tool, the second restriction part is formed integrally with at least one of the one pocket piece and the other pocket piece.

A holder housing tool is such that, in the holder housing tool, at least one of the one pocket piece and the other pocket piece has a width in the direction in which the holder is inserted into the pocket part that is greater on a side closer to the second restriction part than on a side closer to the first restriction part.

A holder housing tool is such that the holder housing tool includes a guide part that guides the holder to the first restriction part by being inserted into the opening part of the holder.

A holder housing tool is such that the holder housing tool includes a guide part protruding from the pocket part on the side of a tip portion of the guide part and used for guiding the holder to the first restriction part adjacent to a base end portion of the guide part by being inserted into the opening part of the holder.

A holder housing tool is such that, in the holder housing tool, the guide part has a shortest distance from a tip portion of the guide part to the second restriction part that is shorter than a shortest distance from the first restriction part to the second restriction part.

A holder housing tool is such that the holder housing tool includes: a cover body; and an attachment for attaching at least the first restriction part and the second restriction part to the cover body.

A holder housing tool is such that, in the holder housing tool, the attachment is attachable to and detachable from the cover body.

A holder housing tool is such that, in the holder housing tool, the cover body includes: a spine section; a first cover section and a second cover section connected to the spine section via hinge parts; and an engagement part that allows engagement and disengagement between the first cover section and the second cover section.

A holder housing tool is such that, in the holder housing tool, the engagement part includes: a receiver formed at one of the first cover section and the second cover section; and an engagement piece formed integrally with the other of the first cover section and the second cover section and engaged with the receiver toward a direction of going farther from the spine section.

A file includes: the holder housing tool; and a holder housed in the holder housing tool.

According to the present invention, high general-purpose properties and favorable usability are provided.

DETAILED DESCRIPTION

Figure 1:
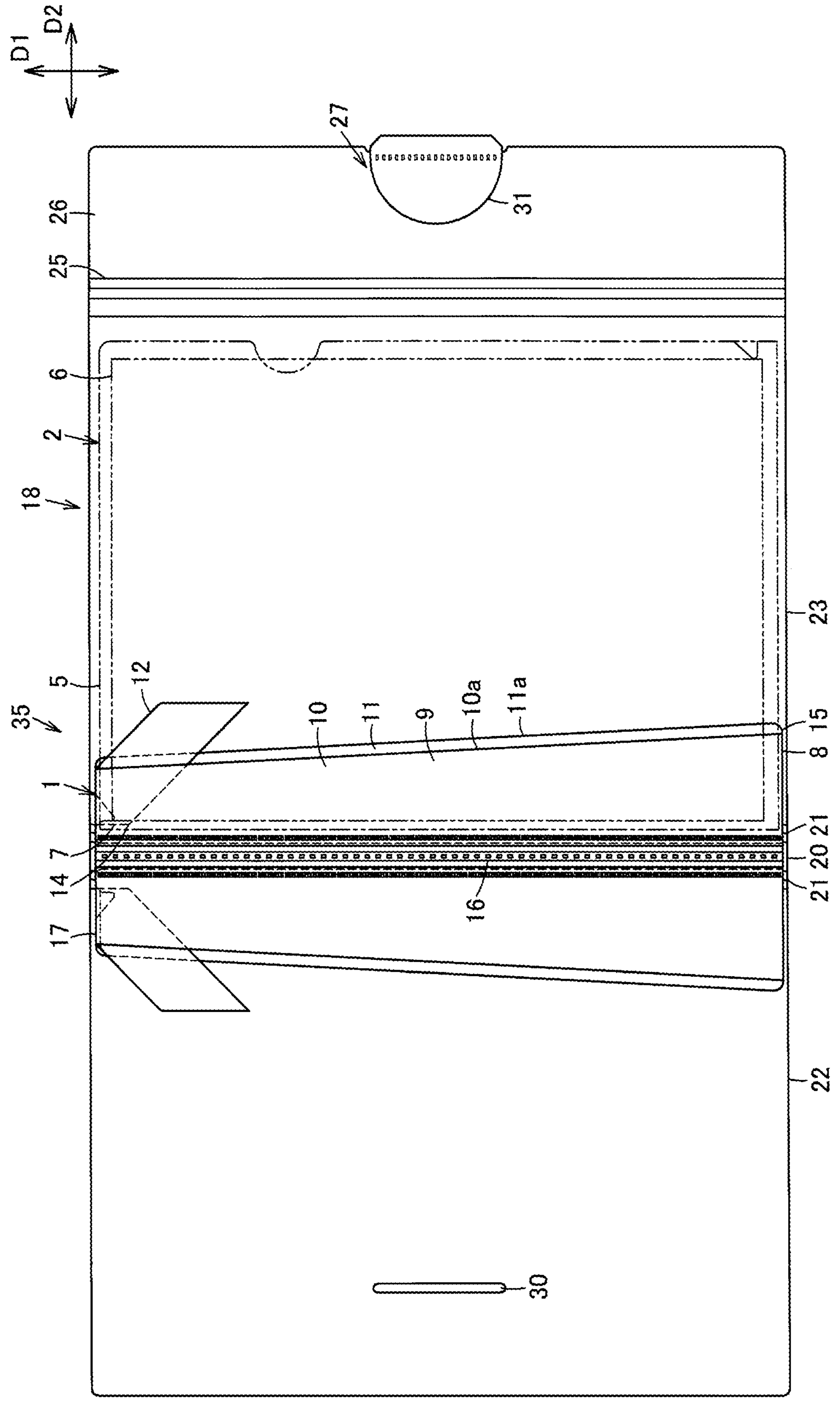
FIG. 1 is a front view showing a spread state of a holder housing tool according to a first embodiment of the present invention.

A first embodiment of the present invention will be described below in detail by referring to the drawings. In the following, positions defined in a left-and-right direction visually recognized in FIG. 1 and in a corresponding direction shown in other drawings are expressed as "left" and "right." Furthermore, positions defined in an up-and-down direction visually recognized in FIG. 1 and in a corresponding direction shown in other drawings are expressed as "upper" and "lower."

Figure 2:
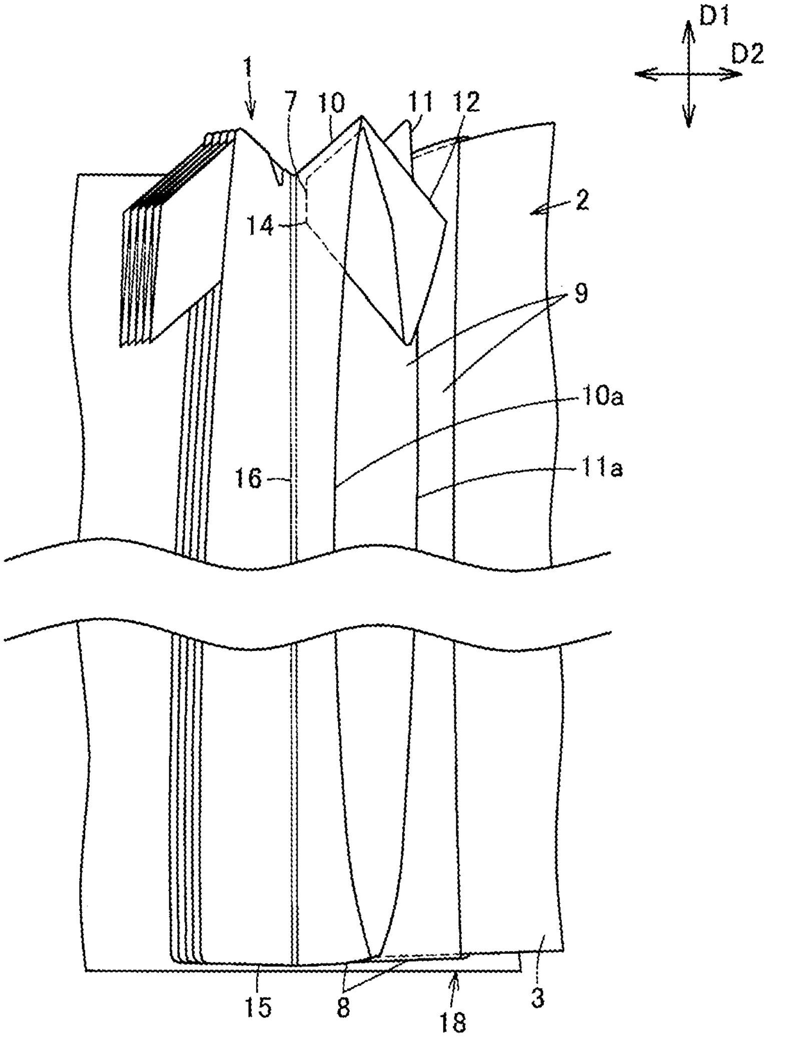
FIG. 2 is a perspective view showing a part of the spread state of the holder housing tool from the front.

In FIGS. 1 and 2, 1 is a holder housing tool. The holder housing tool 1 is to house at least one, preferably, a plurality of holders 2. In each of the drawings, the directions are indicated by arrows. The following description is on the assumption that a direction with an arrow D1 corresponds to the up-and-down direction, a direction with an arrow D2 corresponds to the left-and-right direction, and a direction with an arrow D3 (FIG. 5) corresponds to a back-and-forth direction.

Figure 4:
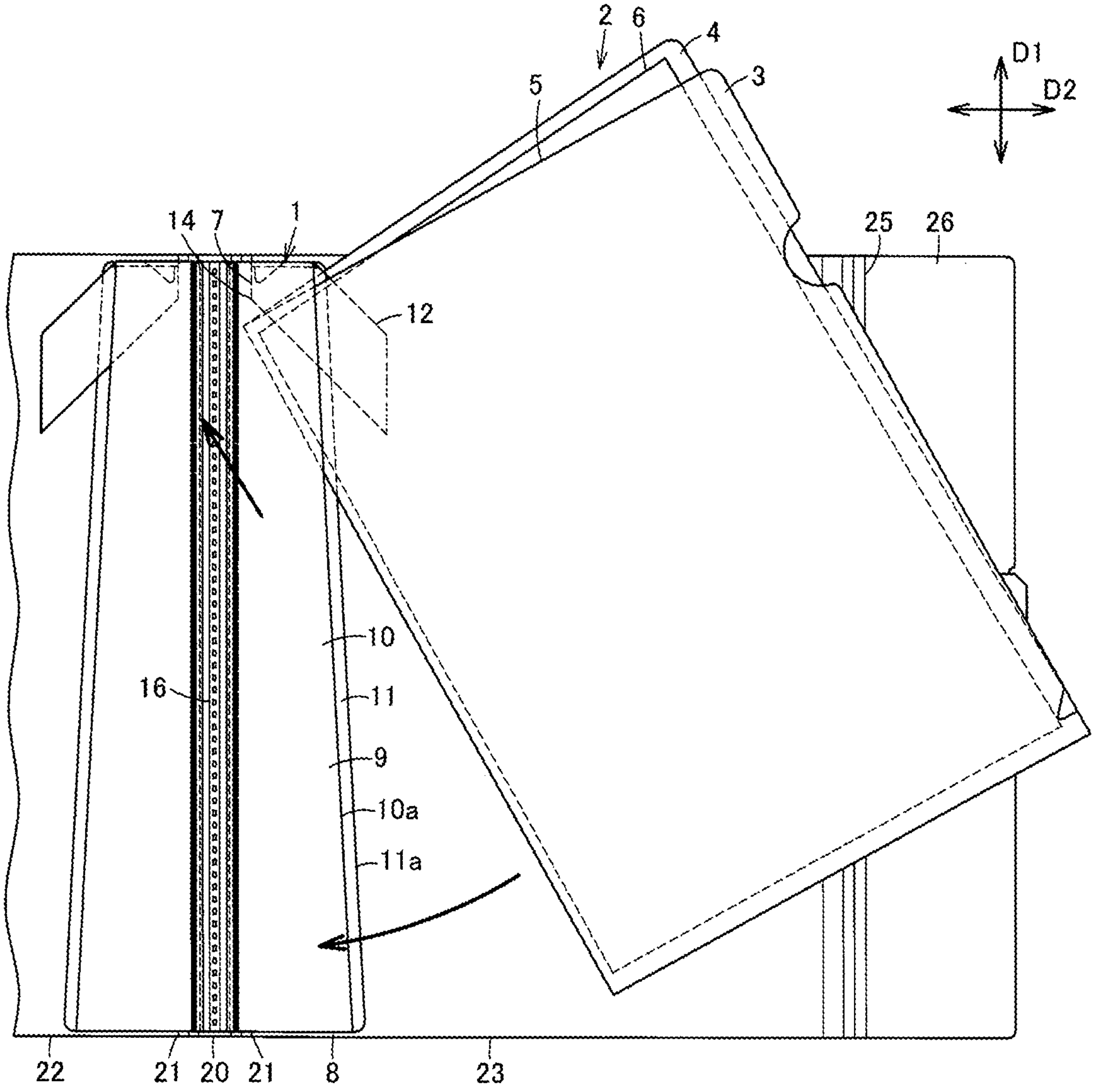
FIG. 4 is a front view showing a method of using the holder housing tool.

As shown in FIG. 4, the holder 2, as an example, is formed into a pocket-like shape by bending one sheet to form sheets 3 and 4 across a resultant fold having rectangular shapes equal or substantially equal to each other, and fixedly attaching one end portions of the sheets 3 and 4 to each other. At the holder 2, the fold is formed at at least one long side portions as one lateral side portions of the sheets 3 and 4, lower side portions that are one short side portions as one end side portions of the sheets 3 and 4 are fixedly attached to each other, and an opening part 5 is formed at upper side portions that are the other short side portions as the other end side portions of the sheets 3 and 4. The positions of the one lateral side portions with the fold and those of the fixedly-attached one end side portions may be reversed from each other. In the present embodiment, the opening part 5 extends from the other short side portions to the other long side portions as the other lateral side portions of the sheets 3 and 4. An item 6 to be stored such as a paper sheet or the like, is put into the holder 2 and the stored item 6 is taken out of the holder 2 through the opening part 5. The holder 2 is not limited to this configuration but may be formed into a pocket-like shape by overlaying the sheet 3 and the sheet 4 each being one sheet on each other and fixedly attaching respective end side portions to each other. Moreover, as long as the holder 2 is formed in such a manner that a first restriction part 7 is inserted into the opening part 5 of the holder 2 to be hooked on one edge portion of the opening part 5 in response to housing of the holder 2 into the holder housing tool 1, an opening part may not be formed at an end side portion other than the end side portions where the opening part 5 is provided.

Preferably, at least one of the sheets 3 and 4 is made of a transparent or semi-transparent material at least partially. In the illustrated example, each of the sheets 3 and 4 is entirely made of a transparent or semi-transparent material. For example, the sheets 3 and 4 are made of synthetic resin such as polypropylene. In the present embodiment, the holder 2 is a general-purpose clear folder.

As shown in FIGS. 1 and 2, the holder housing tool 1 includes the first restriction part 7 for hooking the holder 2, and a second restriction part 8 that restricts the position of the holder 2.

The first restriction part 7 is hooked on one edge portion of the opening part 5 of the holder 2 by being inserted into the opening part 5. The first restriction part 7 is located at an upper end portion of the holder housing tool 1 and extends in the up-and-down direction. Specifically, the first restriction part 7 is hooked on the one edge portion of the opening part 5 of the holder 2 to restrict the position of the holder 2 in the left-and-right direction. Preferably, the first restriction part 7 is made of a transparent or semi-transparent material.

The second restriction part 8 restricts the position of the holder 2 at a position where the first restriction part 7 is hooked on the one edge portion of the opening part 5 by coming into contact with the holder 2. Specifically, the second restriction part 8 restricts the position of the holder 2 in the up-and-down direction. Preferably, the second restriction part 8 contacts the holder 2 at a position separated from the opening part 5. In the present embodiment, the second restriction part 8 is located at a lower end portion of the holder housing tool 1 and extends in the left-and-right direction crossing or perpendicular to a direction in which the first restriction part 7 extends. Specifically, the second restriction part 8 restricts the position of the holder 2 in the up-and-down direction by coming into contact with the holder 2 at a lower end portion (lower side portion) thereof that is an end portion on the opposite side to the opening part 5. Preferably, the second restriction part 8 is made of a transparent or semi-transparent material.

In the present embodiment, the holder housing tool 1 includes a pocket part 9 in which the holder 2 is inserted and held on the side of a long side portion that is one edge portion of the holder 2. The pocket part 9 is formed continuously in the up-and-down direction from the first restriction part 7 to the second restriction part 8. The pocket part 9 has a left-and-right dimension that is set less than half of a left-and-right dimension of the holder 2, in the illustrated example, about ⅛.

The pocket part 9 includes one pocket piece 10 and the other pocket piece 11. The one pocket piece 10 and the other pocket piece 11 are formed into rectangular sheet-like shapes extending long in the up-and-down direction and located on opposite sides to each other with respect to the holder 2 inserted into the pocket part 9. Specifically, the one pocket piece 10 and the other pocket piece 11 are overlaid on a front side as one main surface and a back side as the other main surface of the holder 2. Preferably, the one pocket piece 10 and the other pocket piece 11 are made of a transparent or semi-transparent material.

In the present embodiment, the one pocket piece 10 and the other pocket piece 11 have an end portion 10*a* and an end portion 11*a* (right end portions in FIG. 1) adjacent to an opening of the pocket part 9 that are shifted in the left-and-right direction corresponding to a direction in which the holder 2 is inserted into the pocket part 9. In the illustrated example, the end portion 11*a* of the other pocket piece 11 extends further in the left-and-right direction (rightward direction in FIG. 1) than the end portion 10*a* of the one pocket piece 10.

In the present embodiment, at least one of the one pocket piece 10 and the other pocket piece 11 has a width in the left-and-right direction corresponding to the direction in which the holder 2 is inserted into the pocket part 9 that is greater on a lower side closer to the second restriction part 8 than on an upper side closer to the first restriction part 7. In the illustrated example, each of the one pocket piece 10 and the other pocket piece 11 is formed in such a manner as to become wider gradually in the left-and-right direction from the upper side toward the lower side.

As shown in FIG. 2, in the present embodiment, the first restriction part 7 is formed integrally with one of the one pocket piece 10 and the other pocket piece 11. For example, a part of one of the one pocket piece 10 and the other pocket piece 11 is folded toward the other to form the first restriction part 7. In the illustrated example, an upper end portion of the one pocket piece 10 is folded toward the other pocket piece 11, namely, folded backward to form the first restriction part 7 and the first restriction part 7 is located inside the pocket part 9. Specifically, the upper end portion of the one pocket piece 10 is a folded portion continuous with the first restriction part 7. In the present embodiment, the upper end portion of the one pocket piece 10 is folded downward toward the other pocket piece 11, and a tip portion of the folded upper end portion is further folded back upward to form the first restriction part 7 into two layers on the front and the back. Furthermore, in the present embodiment, the one pocket piece 10 and the other pocket piece 11 are not fixedly attached to each other at the respective upper end portions. For clear explanation, the pocket part 9 shown in FIG. 2 is in a state with the one pocket piece 10 and the other pocket piece 11 opened to the front and the back.

In the present embodiment, the second restriction part 8 is formed integrally with at least one of the one pocket piece 10 and the other pocket piece 11. For example, a lower end portion of the pocket part 9 is formed as the second restriction part 8. In the illustrated example, the respective lower end portions of the one pocket piece 10 and the other pocket piece 11 are fixedly attached to each other and the fixedly attached portion between the one pocket piece 10 and the other pocket piece 11 functions as the second restriction part 8.

As shown in FIG. 1, in the present embodiment, the holder housing tool 1 includes a guide part 12 that guides an upper end portion of the holder 2 to the first restriction part 7 by being inserted into the opening part 5. The guide part 12 is formed in such a manner that, while a tip portion side to be inserted into the opening part 5 of the holder 2, namely, an end portion adjacent to the first restriction part 7 is defined as a base end portion side, the guide part 12 is gradually thinned toward a lower position on an end portion side facing the base end portion side. The guide part 12 extends in a tilted pattern from the base end portion side toward the tip portion side in such a manner as to move closer to the second restriction part 8. The guide part 12 extends downward in a direction of going farther from the first restriction part 7 as viewed in the left-and-right direction. Specifically, the guide part 12 is located closer to the second restriction part 8 at a position closer to its tip portion in the up-and-down direction. This makes an up-and-down shortest distance between the tip portion side of the guide part 12 and the second restriction part 8 shorter than an up-and-down shortest distance between the base end portion side of the guide part 12 and the second restriction part 8. The guide part 12 has an up-and-down dimension that is set less than half of an up-and-down dimension of the pocket part 9 or an up-and-down dimension of the holder 2, in the illustrated example, less than ¼.

In the illustrated example, the guide part 12 extends linearly. However, the shape of the guide part 12 is not limited to this shape as long as it fulfills its function. The guide part 12 may have an arbitrary shape such as a shape extending in a curved pattern or an arc-like pattern, or a shape with a partially bent portion. Furthermore, in the present embodiment, the tip portion of the guide part 12 protrudes from the pocket part 9. Specifically, the guide part 12 extends from the interior of the pocket part 9 (first restriction part 7) to the exterior of the pocket part 9. Moreover, the guide part 12 has a left-and-right dimension that is set about twice a left-and-right dimension of the pocket part 9, and is set less than half of a left-and-right dimension of the holder 2, in the illustrated example, about ¼ of the holder 2.

The guide part 12 extends continuously with the first restriction part 7. A corner portion 14 of a bent shape is formed at a position where a lower end portion of the first restriction part 7 and the guide part 12 are continuous with each other. As shown in FIG. 2, in the present embodiment, the guide part 12 is formed integrally with the first restriction part 7. Thus, the guide part 12 is made of a transparent or semi-transparent material. The first restriction part 7 and the guide part 12 form a flap shape (hook shape). In the present embodiment, the guide part 12 and the first restriction part 7 are together formed integrally with one of the one pocket piece 10 and the other pocket piece 11. For example, a part of one of the one pocket piece 10 and the other pocket piece 11 is folded toward the other to form the guide part 12 integrally with the first restriction part 7. In the illustrated example, the upper end portion of the one pocket piece 10 is folded toward the other pocket piece 11, namely, folded backward to form the first restriction part 7 and the guide part 12.

In the present embodiment, the first restriction part 7, the second restriction part 8, the pocket part 9, and the guide part 12 integrally form one housing unit 15. A plurality of the housing units 15 is set in the holder housing tool 1. All the housing units 15 are formed integrally with respective attachments 16. These attachments 16 are overlaid on and fixed to each other to integrally form the holder housing tool 1 with a plurality of the housing units 15 arranged front and back. In the present embodiment, the housing units 15 on both sides of the attachment 16 are connected to this attachment 16 to form a housing body 17 in a spread state, and the housing bodies 17 are overlaid on each other at the positions of the respective attachments 16 to be fixedly attached to and bound to each other integrally. However, this is not the only configuration but three or more housing units 15 may be formed integrally with one attachment 16. The pocket part 9 and the guide part 12 are not essential structures of the housing unit 15.

The attachment 16 is attached to a cover body 18. Specifically, the attachment 16 is used to fix at least the first restriction part 7 and the second restriction part 8, in the present embodiment, to fix the first restriction part 7, the second restriction part 8, the pocket part 9, and the guide part 12, namely, to fix the housing unit 15 in a manner allowing pivotal motion relative to the cover body 18.

Figure 3:
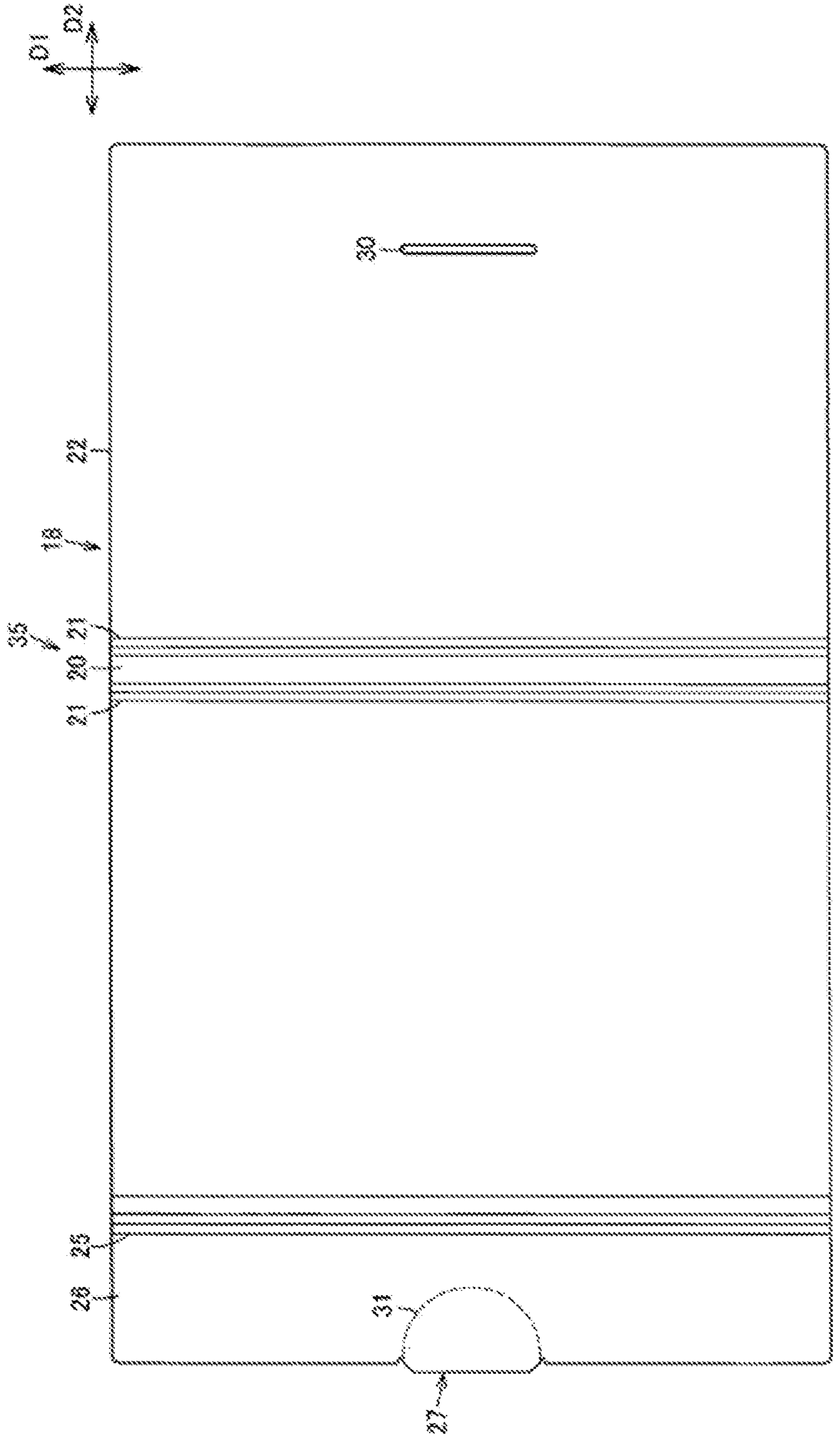
FIG. 3 is a back view showing the spread state of the holder housing tool.

The cover body 18 shown in FIGS. 1 to 3 is to protect the holder 2. The cover body 18 includes a spine section 20, and a first cover section 22 and a second cover section 23 connected to the spine section 20 via hinge parts 21. The cover body 18 is made of synthetic resin or paper and formed into a rectangular shape.

The attachment 16 is attached to the spine section 20. The spine section 20 is formed into a rectangular shape elongated in up-and-down direction.

Figure 6:
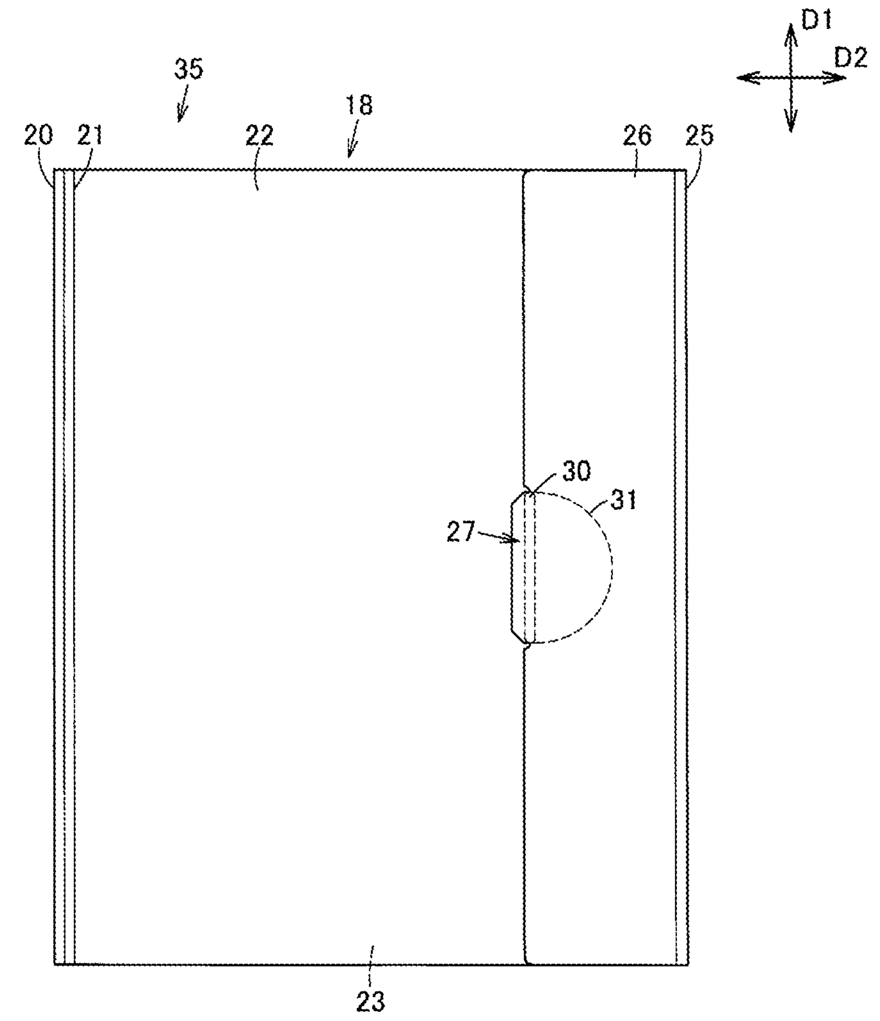
FIG. 6 is a front view showing a closed state of the holder housing tool.
Figure 7:
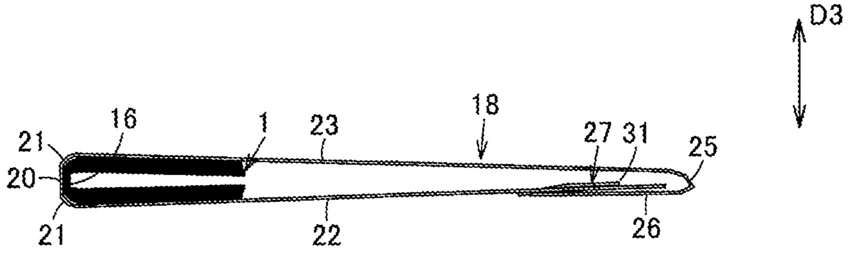
FIG. 7 is a plan view showing the closed state of the holder housing tool.

The hinge parts 21 are parts that make the first cover section 22 and the second cover section 23 bendable relative to the spine section 20 in order to bring the cover body 18 to a spread state shown in FIG. 1 and a closed state shown in FIGS. 6 and 7.

As shown in FIG. 1, the first cover section 22 and the second cover section 23 are connected to the spine section 20 on the right and left sides of the spine section 20. The first cover section 22 and the second cover section 23 are each formed into a rectangular shape greater in up-and-down dimension and left-and-right dimension than the holder 2. The first cover section 22 and the second cover section 23 are configured to cover the holder 2 from the front and the back housed in the holder housing tool 1 with the cover body 18 folded from the hinge parts 21.

In the present embodiment, the cover body 18 further includes a flap part 26 connected to one of the first cover section 22 and the second cover section 23 via a hinge part 25, and an engagement part 27 that allows engagement and disengagement between the first cover section 22 and the second cover section 23.

The flap part 26 extends in the left-and-right direction from the first cover section 22 or the second cover section 23. The flap part 26 is folded back from the hinge part 25 to be overlaid on the other of the first cover section 22 and the second cover section 23. As shown in FIGS. 6 and 7, in the present embodiment, the flap part 26 is connected to the second cover section 23 and folded back from the hinge part 25 to be overlaid on the first cover section 22. In the present embodiment, the flap part 26 is overlaid on an outer side of the first cover section 22.

As shown in FIGS. 1, 3, and 6, the engagement part 27 is composed of a receiver 30 formed at at least one of the first cover section 22 and the second cover section 23, and an engagement piece 31 formed integrally with the other of the first cover section 22 and the second cover section 23.

In the present embodiment, the receiver 30 is formed at the first cover section 22. In the illustrated example, the receiver 30 is an engagement opening part formed as a hole or a slit. The receiver 30 is formed at a central area in the up-and-down direction into a shape extending long in the up-and-down direction. Furthermore, the receiver 30 is arranged at a position separated from the hinge parts 21, namely, from the spine section 20.

The engagement piece 31 is a segment to be engaged with the receiver 30. In the present embodiment, the engagement piece 31 is formed at an edge portion of the flap part 26 on the opposite side to the hinge part 25. In the illustrated example, the engagement piece 31 extends from the edge portion of the flap part 26 on the opposite side to the hinge part 25 toward the hinge part 25. Thus, as shown in FIG. 6, the engagement piece 31 is engaged with the receiver 30 toward a direction of going farther from the spine section 20. In the present embodiment, as the flap part 26 is configured to be overlaid on the outer side of the first cover section 22, the engagement piece 31 is formed inside the flap part 26, namely, on a main surface side facing the outer side of the first cover section 22. Meanwhile, if the flap part 26 is configured to be overlaid on an inner side of the first cover section 22, the engagement piece 31 may be formed outside the flap part 26. While the engagement piece 31 may have an arbitrary shape, it has a semicircular shape in the present embodiment. Specifically, the engagement piece 31 has an outer edge formed into an arc-like shape.

The engagement part 27 is not limited to a configuration including the receiver 30 as an opening part and the engagement piece 31 as a segment. The engagement part 27 may be configured in such a manner that the engagement piece 31 having a shape like a claw, a hook, a loop, or the like is hooked on and engaged with the receiver 30, for example.

As shown in FIG. 1, one or more holders 2 are housed in the holder housing tool 1 to form a file 35. In the file 35, the holders 2 may be housed in all the housing units 15 of the holder housing tool 1. In another case, the holders 2 may be housed in advance in some of the housing units 15 in such a manner that the holders 2 can be housed into and removed from these housing units 15, and the other housing units 15 may be used for allowing the holders 2 such as general-purpose clear folders to be housed into and removed from these housing units 15.

The operation and effect of the first embodiment will be described next.

Figure 5A:
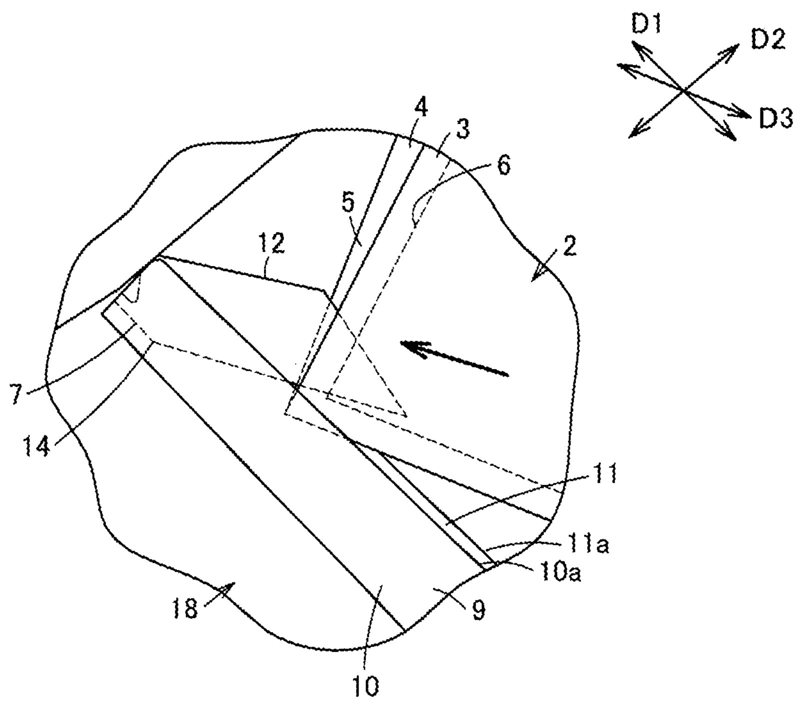
FIG. 5A is a perspective view showing operation on the side of a first restriction part in FIG. 4.
Figure 5B:
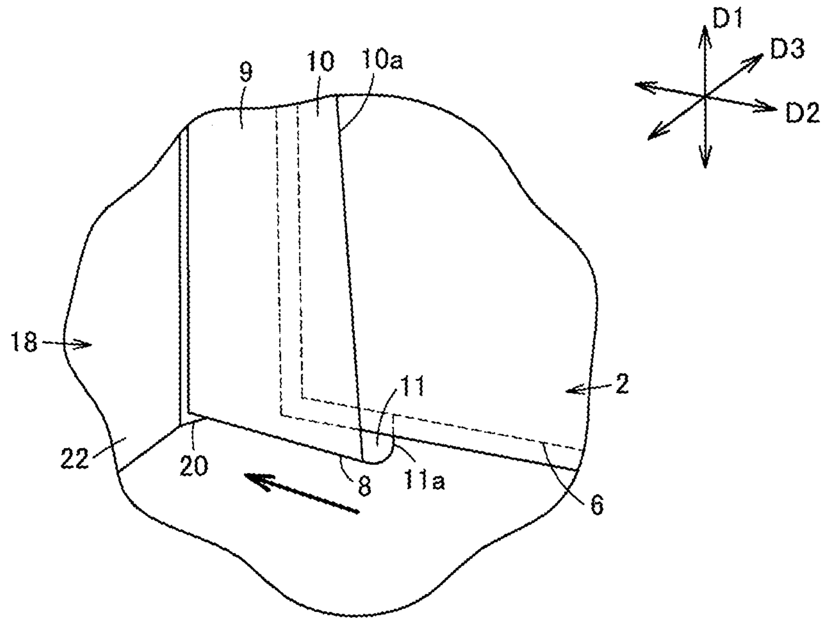
FIG. 5B is a perspective view showing operation on the side of a second restriction part in FIG. 4.

To house the holder 2 into the holder housing tool 1, the first cover section 22 and the second cover section 23 of the cover body 18 of the holder housing tool 1 are opened to bring the holder housing tool 1 to the spread state as shown in FIG. 1. Then, as shown in FIGS. 4 and 5A, the guide part 12 is inserted into the one edge portion of the opening part 5 of the holder 2. While the holder 2 is moved along the guide part 12 toward the first restriction part 7, the holder 2 is caused to pivot about a cardinal point on the side of its upper end portion adjacent to the first restriction part 7 in such a manner as to get closer on the side of its lower end portion to the second restriction part 8, as shown in FIGS. 4 and 5B. If the stored item 6 is held in the holder 2, the guide part 12 is inserted between the stored item 6 and the sheet 3 of the holder 2. By doing so, even if a corner of the stored item 6 is fastened using a stapler or a clip, the insertion proceeds without problem. Then, in the present embodiment, the holder 2 is inserted on the side of its one edge portion between the one pocket piece 10 and the other pocket piece 11 of the pocket part 9.

As a result, the one edge portion of the opening part 5 of the holder 2 goes around a lateral portion of the first restriction part 7 across the corner portion 14 to be hooked on the first restriction part 7 in the left-and-right direction. At this position, the second restriction part 8 comes into contact with the lower end portion of the holder 2 that is an end portion on the opposite side to the opening part 5 to restrict the position of the holder 2 in the up-and-down direction, thereby holding the holder 2 at the position where the first restriction part 7 is hooked on the one edge portion of the opening part 5. By doing so, the movement of the holder 2 relative to the holder housing tool 1 is restricted in the up-and-down direction and the left-and-right direction by the first restriction part 7 and the second restriction part 8. This prevents the holder 2 from coming off the holder housing tool 1 in the up-and-down direction and the left-and-right direction, so that the holder 2 is housed and held stably in the holder housing tool 1.

In this state, the opening part 5 of the holder 2 can be opened and closed without being blocked by the first restriction part 7, the second restriction part 8, and the pocket part 9. This facilitates putting-in of the item 6 to be stored and taking-out of the stored item 6 through the opening part 5 while the holder 2 remains housed in the holder housing tool 1. In particular, as the respective upper end portions of the one pocket piece 10 and the other pocket piece 11 of the pocket part 9 are separated without being fixedly attached to each other, the holder 2 can entirely be opened easily at the opening part 5.

In the presence of a plurality of the holders 2 housed in the holder housing tool 1, a necessary holder 2, specifically, a necessary stored item 6 can be found easily in the spread state.

Furthermore, by bending the first cover section 22 and the second cover section 23 of the cover body 18 from the hinge parts 21 and overlaying the first cover section 22 and the second cover section 23 on the holder 2 to form the closed state and engaging the first cover section 22 and the second cover section 23 with each other using the engagement part 27, the holder housing tool 1 is retained in the closed state as shown in FIGS. 6 and 7. This facilitates carrying or the like of the holder housing tool 1.

As described above, the holder 2 is housed and held in the holder housing tool 1 of the first embodiment by inserting the first restriction part 7 into the opening part 5 of the holder 2 and hooking the first restriction part 7 on the one edge portion of the opening part 5, and bringing the second restriction part 8 into contact with the holder 2 to restrict the position of the holder 2 at a position where the first restriction part 7 is hooked. This allows the holder 2 to be housed and held in a state where the holder 2 is unlikely to come off using the first restriction part 7 and the second restriction part 8 while using the general-purpose holder 2 with the opening part 5. Additionally, even if the holder 2 holds the stored item 6 therein, the stored item 6 is unlikely to affect work of housing so the holder 2 can still be housed as it is in the holder housing tool 1. Furthermore, the holder 2 can be released from the hook using the first restriction part 7 by being released from the contact with the second restriction part 8 and can be removed from the holder housing tool 1 to be available for use. In this way, according to the present embodiment, it is possible to provide the holder housing tool 1 with high general-purpose properties and favorable usability.

As the second restriction part 8 contacts the holder 2 at a position separated from the opening part 5, the holder 2 housed in the holder housing tool 1 is only in a state where the first restriction part 7 is hooked on the opening part 5. This facilitates putting-in of the item 6 to be stored and taking-out of the stored item 6 through the opening part 5.

By the provision of the pocket part 9 in which the holder 2 is inserted and held on the side of its one edge portion, the holder 2 can be housed and held more reliably in the holder housing tool 1 while the pocket part 9 does not hinder putting-in of the item 6 to be stored and taking-out of the stored item 6 to and from the holder 2 through the opening part 5.

The end portions 10*a* and 11*a* of the one pocket piece 10 and the other pocket piece 11 respectively adjacent to the opening of the pocket part 9 are shifted in the direction in which the holder 2 is inserted into the pocket part 9. Thus, in inserting the holder 2 on the side of its one edge portion into the pocket part 9, the holder 2 is inserted easily between the one pocket piece 10 and the other pocket piece 11.

Forming the first restriction part 7 integrally with one of the one pocket piece 10 and the other pocket piece 11 provides favorable manufacturing performance, compared to a case of forming the first restriction part 7 separately from the one pocket piece 10 and the other pocket piece 11.

Forming the first restriction part 7 by folding a part of one of the one pocket piece 10 and the other pocket piece 11 toward the other facilitates formation of the first restriction part 7. Furthermore, using stress generated by folding the first restriction part 7, the one pocket piece 10 and the other pocket piece 11 are retained in a state of being close to each other in the pocket part 9. This can make it unlikely that the opening of the pocket part 9 will be opened over time, so that the holder 2 can be housed and held reliably on the side of its one edge portion in the pocket part 9.

Additionally, the upper end portion of one of the one pocket piece 10 and the other pocket piece 11 continuous with the first restriction part 7 functions as a cardinal point in causing the holder 2 to pivot for housing the holder 2. This facilitates work of hooking the one edge portion of the opening part 5 of the holder 2 on the first restriction part 7 and bringing the holder 2 into contact with the second restriction part 8.

Forming the second restriction part 8 integrally with at least one of the one pocket piece 10 and the other pocket piece 11 provides favorable manufacturing performance, compared to a case of forming the second restriction part 8 separately from the one pocket piece 10 and the other pocket piece 11.

At least one of the one pocket piece 10 and the other pocket piece 11 has a width in the direction in which the holder 2 is inserted into the pocket part 9 that is greater on the lower side closer to the second restriction part 8 than on the upper side closer to the first restriction part 7. This allows the holder 2 to be housed and held reliably in the pocket part 9 on the side of its end portion restricted by the second restriction part 8 while allowing the first restriction part 7 to be hooked easily on the one edge portion of the opening part 5 of the holder 2. In particular, in the present embodiment, the holder 2 is housed in the holder housing tool 1 by causing the holder 2 on the side of its lower end portion to pivot toward the second restriction part 8 about a cardinal point adjacent to the first restriction part 7, namely, to the opening part 5. Thus, while this pivotal motion is unlikely to be hindered by friction or sliding resistance between the one pocket piece 10 or the other pocket piece 11 and the opening part 5 of the holder 2, it is possible to house and hold the holder 2 reliably in the pocket part 9 on a side adjacent to the second restriction part 8.

By the provision of the guide part 12 that guides the holder 2 to the first restriction part 7 by being inserted into the opening part 5, it is possible to guide the holder 2 on a side adjacent to the opening part 5 easily to the first restriction part 7 along the guide part 12.

By protruding the guide part 12 on the side of its tip portion from the pocket part 9, it becomes possible to insert the guide part 12 easily into the opening part 5 of the holder 2. Furthermore, by moving the holder 2 along the guide part 12 from the tip portion toward the base end portion of the guide part 12, it becomes possible to guide the one edge portion of the holder 2 easily to the pocket part 9 and to the first restriction part 7 adjacent to the base end portion.

As the guide part 12 extends in a tilted pattern from a side adjacent to the first restriction part 7 toward the second restriction part 8, guiding the holder 2 on a side adjacent to the opening part 5 along the guide part 12 makes the holder 2 extend in a tilted pattern. This facilitates continuous motion of causing the holder 2 on the side of its lower end portion to pivot toward the second restriction part 8 about a cardinal point adjacent to the opening part 5 for housing the holder 2, and allows the one edge portion of the opening part 5 to go around the lateral portion of the first restriction part 7 easily during the pivotal motion of the holder 2.

Attaching at least the first restriction part 7 and the second restriction part 8 to the cover body 18 using the attachment 16 allows the housed holder 2 to be protected by the cover body 18.

By allowing engagement and disengagement between the first cover section 22 and the second cover section 23 connected to the spine section 20 via the hinge parts 21 using the engagement part 27, it becomes possible to bring the holder housing tool 1 to the spread state and the closed state. Thus, bringing the holder housing tool 1 to the spread state allows the holder 2 and the stored item 6 to be found easily and bringing the holder housing tool 1 to the closed state facilitates carrying or the like of the holder housing tool 1.

Moreover, the engagement piece 31 of the engagement part 27 is engaged with the receiver 30 toward a direction of going farther from the spine section 20. Thus, if the first cover section 22 and the second cover section 23 are caused to pivot from the hinge parts 21 and the cover body 18 tries to restore to the spread state, the engagement piece 31 becomes engaged with the receiver 30 more largely. This prevents the engagement part 27 from being disengaged easily as a result of stress occurring when the cover body 18 is deformed in trying to restore from the hinge parts 21 in the presence of a large number of housed holders 2, for example, thereby allowing the holder housing tool 1 to be retained in the closed state.

Furthermore, as the housing unit 15 is made of a transparent or semi-transparent material, the housing unit 15 is unlikely to reduce visibility of the stored item 6 held in the housed holder 2. Thus, the stored item 6 held in the holder 2 can be found easily.

The file 35 is formed by housing the holder 2 in the above-described holder housing tool 1. Thus, it becomes possible to provide the file 35 with favorable usability allowing housing of a large number of stored items 6 together with the holder 2 and allowing the stored item 6 to be found easily by forming the spread state, as necessary, and facilitating putting-in of the item 6 to be stored and taking-out of the stored item 6 to and from the housed holder 2.

By using a transparent or semi-transparent material for forming at least a part of the holder 2, even in the presence of a plurality of the holders 2 housed in the holder housing tool 1, it still becomes possible to easily find the stored item 6 held in the holder 2.

Using a general-purpose clear folder as the holder 2 makes it possible to add the general-purpose holder 2 to the holder housing tool 1 according to need or to detach the holder 2 from the holder housing tool 1 and use the detached holder 2 individually.

Figure 8:
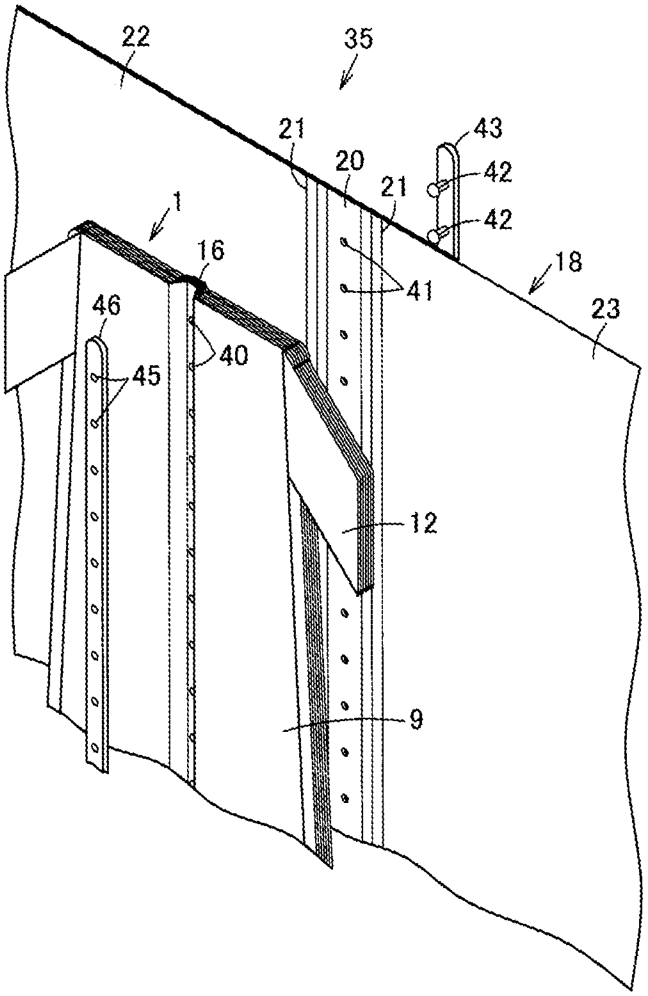
FIG. 8 is a perspective view showing a part of a spread state of a holder housing tool according to a second embodiment of the present invention.

In the first embodiment, the attachment 16 may be attachable to and detachable from the cover body 18. A configuration of making the attachment 16 attachable to and detachable from the cover body 18 can be determined freely. Like a second embodiment shown in FIG. 8, as an example of this configuration, one or a plurality of holes 40 and one or a plurality of holes 41 are formed at the attachment 16 and the spine section 20 of the cover body 18. Using one attachment body 43 with projections 42 to be inserted into these holes 40 and 41 and a different attachment body 46 with projection receivers 45 to receive the projections 42, the attachment 16 and the cover body 18 are integrally interposed between the one attachment body 43 and the different attachment body 46 and fixed to each other.

The invention claimed is:

1. A holder housing tool that houses a holder to store an item to be stored in a manner allowing the item to be stored to be put into the holder and the stored item to be taken out of the holder through an opening part of the holder, comprising:

a first restriction part hooked on one edge portion of the opening part of the holder by being inserted into the opening part;

a second restriction part that restricts the position of the holder at a position where the first restriction part is hooked by coming into contact with the holder; and a pocket part in which the holder is inserted and held on a side of the one edge portion of the holder, the pocket part comprising a first pocket piece, a second pocket piece, and an opening, the first pocket piece and the second pocket piece located on opposite sides to each other with respect to the holder and each comprising respective end portions adjacent to the opening of the pocket part that are shifted in a direction in which the holder is inserted into the pocket part, the first restriction part formed integrally with one of the first pocket piece or the second pocket piece and comprising a shape in which a part of the first pocket piece or the second pocket piece is folded into the other.

2. The holder housing tool according to claim 1, wherein the second restriction part contacts the holder at a position separated from the opening part.

3. The holder housing tool according to claim 1, wherein the second restriction part is formed integrally with at least one of the first pocket piece or the second pocket piece.

4. The holder housing tool according to claim 1, wherein at least one of the first pocket piece or the second pocket piece has a width in the direction in which the holder is inserted into the pocket part that is greater on a side closer to the second restriction part than on a side closer to the first restriction part.

5. The holder housing tool according to claim 1, comprising:

a guide part that guides the holder to the first restriction part by being inserted into the opening part of the holder.

6. The holder housing tool according to claim 1, comprising:

a guide part protruding from the pocket part on the side of a tip portion of the guide part and used for guiding the holder to the first restriction part adjacent to a base end portion of the guide part by being inserted into the opening part of the holder.

7. The holder housing tool according to claim 5, wherein the guide part has a shortest distance from a tip portion of the guide part to the second restriction part that is shorter than a shortest distance from the first restriction part to the second restriction part.

8. The holder housing tool according to claim 1, comprising:

a cover body; and an attachment for attaching at least the first restriction part and the second restriction part to the cover body.

9. The holder housing tool according to claim 8, wherein the attachment is attachable to and detachable from the cover body.

10. The holder housing tool according to claim 8, wherein the cover body includes:

a spine section;

a first cover section and a second cover section connected to the spine section via hinge parts; and an engagement part that allows engagement and disengagement between the first cover section and the second cover section.

11. The holder housing tool according to claim 10, wherein the engagement part includes:

a receiver formed at one of the first cover section and the second cover section; and an engagement piece formed integrally with the other of the first cover section and the second cover section and engaged with the receiver toward a direction of going farther from the spine section.

12. A file comprising:

the holder housing tool according to claim 1; and a holder housed in the holder housing tool.

* * * * *